United States Patent

[11] 3,577,178

| [72] | Inventor | Opie D. Hawley |
| | | San Pedro, Calif. |
| [21] | Appl. No. | 816,225 |
| [22] | Filed | Apr. 15, 1969 |
| [45] | Patented | May 4, 1971 |
| [73] | Assignee | Northrop Corporation |
| | | Beverly Hills, Calif. |

[54] PHASE LOCK INDICATOR FOR PLURAL PHASE LOCK LOOPS
6 Claims, 4 Drawing Figs.

| [52] | U.S. Cl. | 324/83D, 340/170 |
| [51] | Int. Cl. | G01r 25/00 |
| [50] | Field of Search | 324/83 (A), 83 (D); 340/170; 307/232; 343/105 |

[56] References Cited
UNITED STATES PATENTS
| 3,049,673 | 8/1962 | Barry | 340/170X |
| 3,265,904 | 8/1966 | Spencer | 307/232 |

*Primary Examiner*—Alfred E. Smith
*Attorneys*—William W. Rundle and Willard M. Graham ABSTRACT: An indicator or monitor is disclosed which shows whether each of a plurality of phase lock loops are locked onto their respective incoming signals or not. The output of a single in-phase detector which is time-shared by the several loops is fed to a reset integrator, then a level detector, and to the set-reset terminals of a plurality of flip-flops. The flip-flops are sequentially clocked by respective timing signals corresponding to the occurrence of the incoming signals associated with their particular loop. The output state of each flip-flop drives an indicator lamp circuit to show the desired locked or not locked condition.

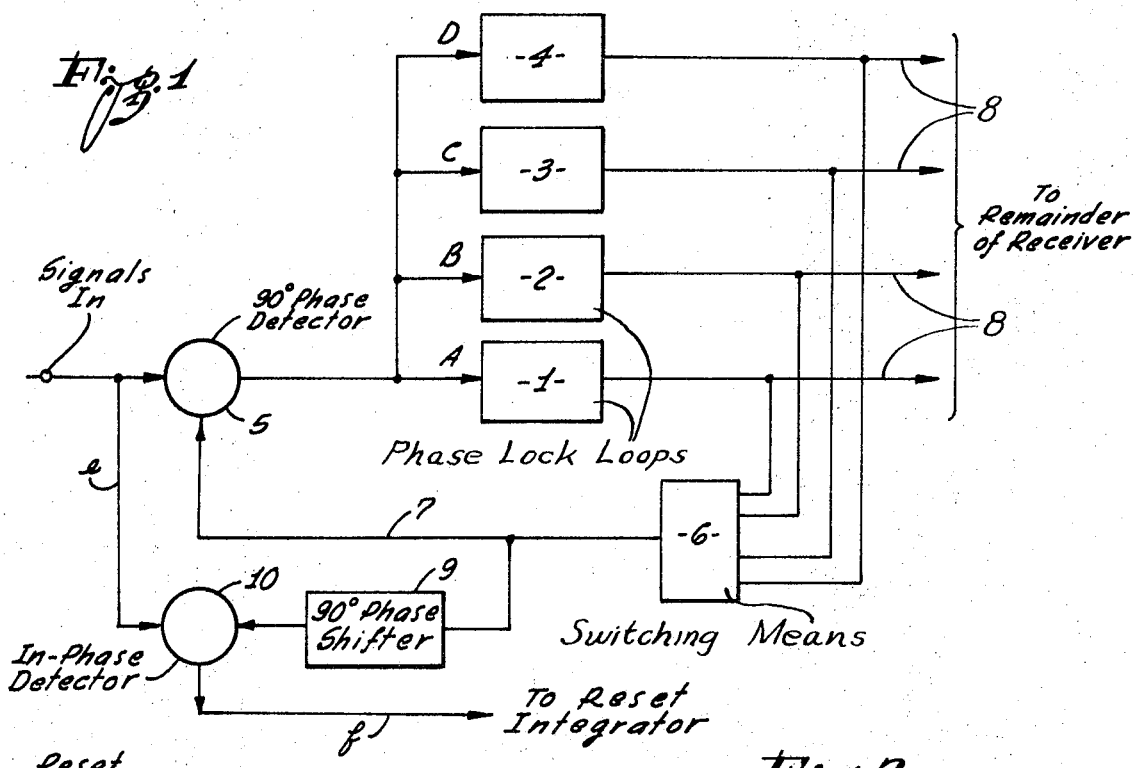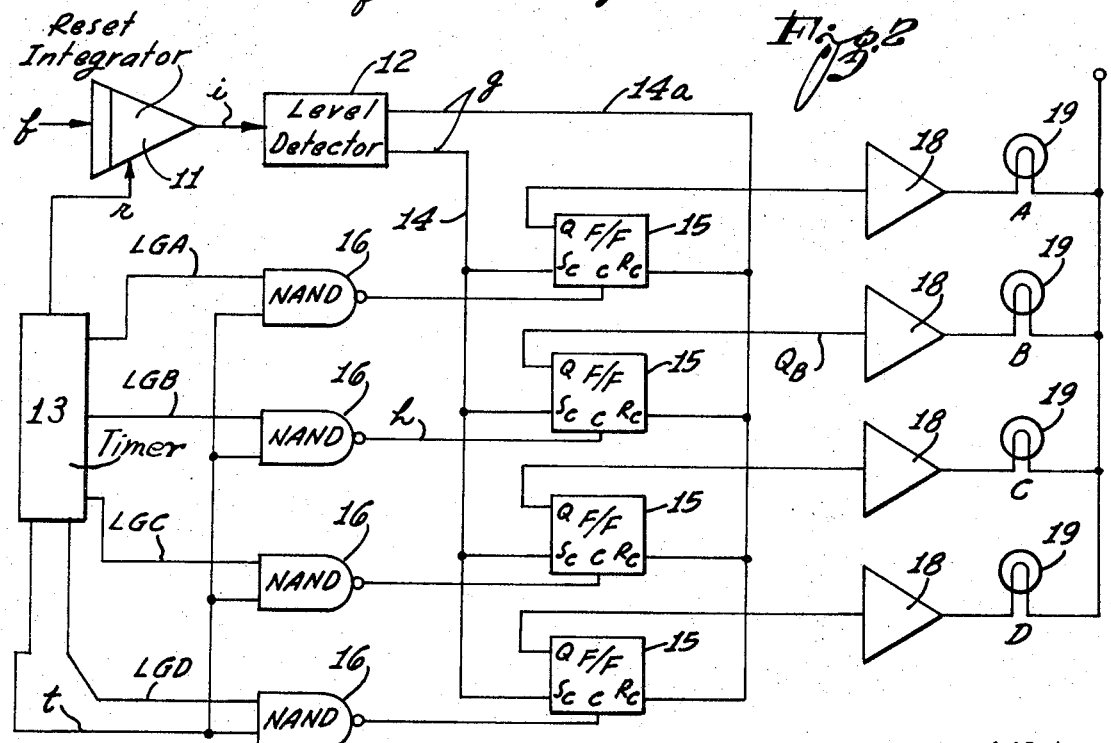

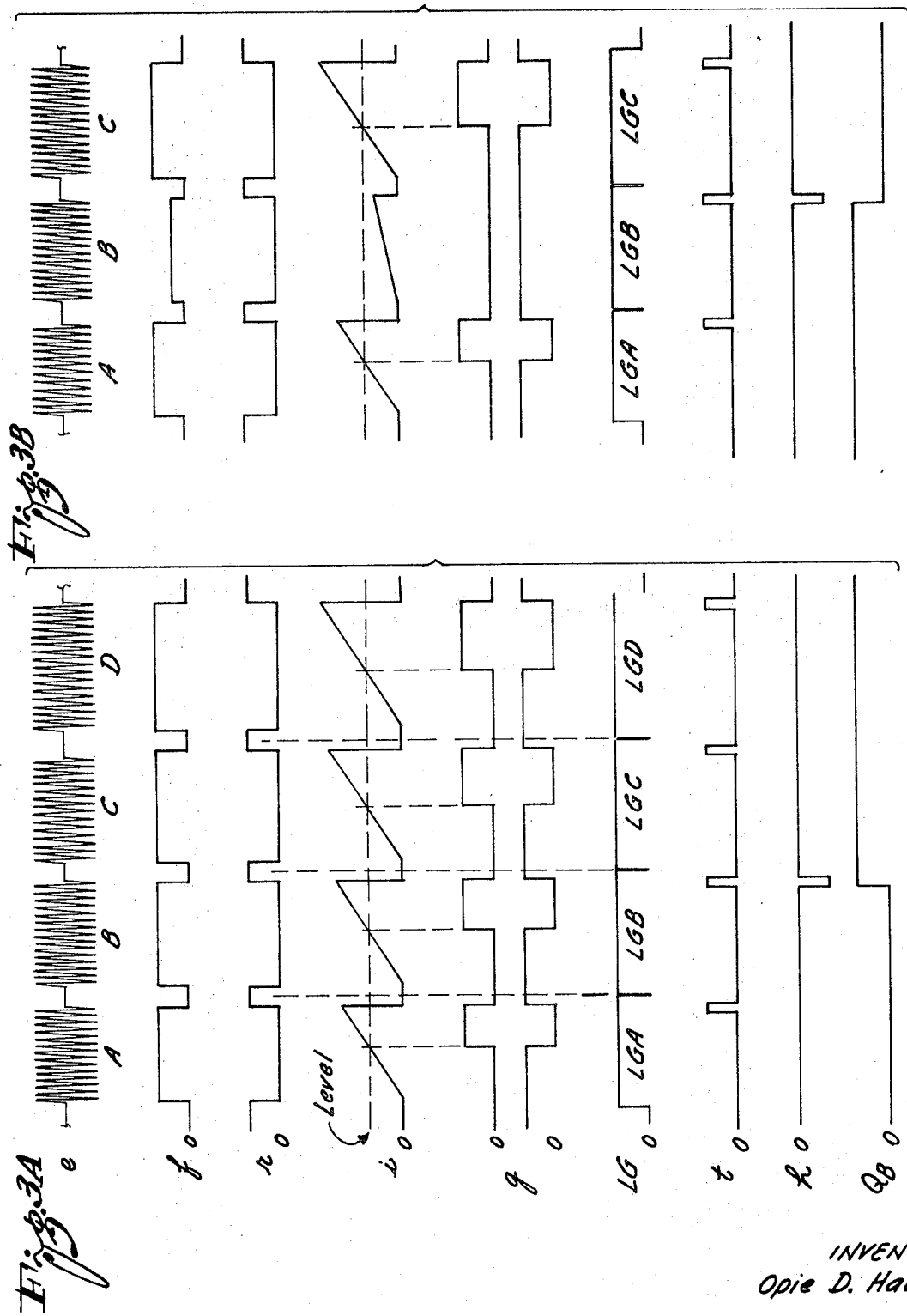

PHASE LOCK INDICATOR FOR PLURAL PHASE LOCK LOOPS

The present invention relates to electronic phase-controlled systems, and more particularly, to an indicating system for visually showing when each of a plurality of phase lock loops is operating at the desired phase angle relative to its respective incoming signals.

Various signal-handling systems depend on the measurement of phase difference as a control signal or indication of a desired result. In the worldwise long distance Omega radio navigation system, for example, the signals from several transmitter stations are processed at a receiver location to obtain the relative phase of the signals. The stations may transmit at the same frequency or at different frequencies. Such a system may employ four transmitting stations, for example, and a receiving set may then have four-phase lock loops acting as very narrow bandwidth filters, to "track" their respective incoming signals.

When using phase lock loops in this way, it is necessary to provide indicators that will enable the operator to know when each loop is locked onto its received signal. Prior techniques for such indication have sampled the output of an in-phase detector during the station periods associated with the four loops. These outputs were filtered and stored in four integrators. Level detectors monitored the integrator outputs and drove indicator lamps.

Such conventional procedures are not entirely satisfactory, since four (or more) expensive integrators are required, and very low leakage switches such as reed relays are also required.

It is a primary object of the present invention to provide a phase lock indicator for the above purposes which is economical, and does not require a separate integrator for each phase lock loop.

A further object of this invention is to provide a phase lock indicator which has a faster response time than conventional circuits, and wherein all the switching is done with semiconductor switches.

Other objects and advantages will become evident during the detailed description to follow.

Briefly, my invention comprises a single reset integrator connected to the output of a phase detector which is sequentially comparing the phases of the respective incoming signals with their associated phase lock loops, and a level detector connected to the integrator output. One bistable trigger circuit for each phase lock loop is connected to the level detector output, and each trigger circuit is triggered or gated by suitable timing and logic means during only the intervals when its respective loop information signal is present in the level detector output. An indicator circuit is connected to the output of each trigger circuit, so that an "in-phase" indication is preferably continually displayed only as long as such condition exists, for each individual phase lock loop.

This invention will be more clearly understood by reference to the following description of a preferred embodiment, and to the accompanying illustrative drawings.

In the drawings,

FIG. 1 is a block diagram of a portion of a radio navigation receiving set having a group of phase lock loops for which phase lock indications are to be provided, showing where the present invention is connected into the receiving system.

FIG. 2 is a block diagram showing the preferred embodiment of this invention.

FIG. 3A is a waveform diagram showing the character and timing of the signals present at various points in the circuitry of FIGS. 1 and 2, when the phase loops are locked in.

FIG. 3B is a similar waveform diagram illustrating a "not locked" condition of one of the phase loops.

Referring first to FIG. 1, a received signal pattern enters a 90° phase detector 5 in the Omega navigation receiver. The signal pattern is as shown on top line $e$ of FIG. 3A, comprising a predetermined series of radio frequency bursts from four transmitter stations, at respective time intervals A, B, C, and D. Depending upon the latitude and longitude of the receiver, the phases of the four bursts will differ, and part of the navigation receiver system to measure the phase displacements includes four circuits whose function is to generate signals 90° out of phase from the signals in the respective rf bursts. Phase lock loops, 1, 2, 3, 4 are servo loops connected in parallels with 90° phase detector 5 for this purpose. When the signal from each of these phase lock loops is respectively 90° out of phase with the incoming station burst, and when the station burst is above a predetermined amplitude, a separate phase lock indication is desired.

The phase lock loops, 1, 2, 3, and 4 contain switching means 6 and a common line 7 connected back to the 90° phase detector 5. The signals associated with the phase lock loops on common line 7 are phase shifted 90° by a 90° phase shifter 9 and drive an in-phase detector 10 to which the incoming signal $e$ is also fed. Individual outputs 8 from the phase lock loops are used by further receiver means to determine position.

The present invention is operated from the output of the in-phase detector 10, which has a signal output as shown in line $f$ of FIG. 3A if and when all four phase loops are locked, i.e., the signals out of the phase shifter 9 are in-phase with incoming signals $e$. In other words, signal $f$ is at a maximum for each of the four loops. Referring now to FIGS. 2 and 3A, signal $f$ is fed to a reset integrator 11 having an output $i$, since the integrator 11 is reset after each burst by a reset pulse $r$. This reset pulse is generated by a timer 13 to occur in the "off" spaces between each station burst period.

Integrator output $i$ is fed to a level detector 12 having a suitable threshold level as indicated by the dotted horizontal line on waveform $i$. The output of level detector 12 is a push-pull signal $g$ carried on two conductors 14 and 14$a$.

Four type R–S flip-flops 15 are provided, with conductors 14 and 14$a$ being connected respectively to the $S_c$ and $R_c$ terminals on each flip-flop, as shown in FIG. 2. To the clock terminal $c$ of each flip-flop 15 is connected the output of a NAND gate 16. The single clock terminal is made by joining together terminals $C_s$ and $C_r$ of a conventional R–S flip-flop.

The timer 13 referred ro previously is also used to generate a series of "long gate" pulses LG and a $t$ signal as shown in FIG. 3A. Actually each long gate pulse is supplied on a separate circuit as in FIG. 2 but the four are shown adjacent on a single line in the diagram of FIG. 3A for the sake of brevity of disclosure. Each long gate extends from the middle of the space preceding each station burst to the middle of the space following each burst. The $t$ signal is a small pulse generated near the end of each long gate. The timer 13 itself is not a part of the present invention, as it is a regular component assembly of the receiving system, which can be easily modified, if necessary, to produce desired timing signals.

The $t$ signal is fed to one input of each NAND gate 16. The long gate signals LGA, LGB, etc., are fed respectively to the other input of the four NAND gates 16. From FIG. 3A, it is thus seen that a combination of signal LGB and $t$ through the second NAND gate results in signal $h$ to the clock terminal of its associated individual flip-flop. The other three NAND gates will produce, with signal $t$, similar pulses (not shown) at different times to the other three flip-flops.

At the second flip-flop, the trigger signal $h$ combined with level detector output $g$ produces a high state output signal $Q_B$ at output terminal Q. If a low state output preceded this $h$ pulse, it will be switched to high as pictured in FIG. 3A, and if a high state output preceded this instant it will not change. As long as further succeeding coincidences of $h$ and $g$ continue, the flip-flop output $Q_B$ will remain high. It will be noticed, however, that if the signal $g$ is found in the opposite state when an $h$ pulse appears, the signal $Q_B$ will switch from high to low, as shown in FIG. 3B, and will remain low until an $h$ pulse finds the signal $g$ in the first state as shown in FIG. 3A.

The outputs of the flip-flops 15 drive individual lamp drivers 18 which in turn drive phase lock indicator lamps 19. In the present circuit, a lamp 19 is off when its corresponding phase loop 1—4 is locked. By means of a simple wiring change, the indication could be made to be lamps on when phase loops are locked, if desired.

In an actual embodiment of this system, the pattern of FIG. 3A is repeated once every 10 seconds, so that each phase lock loop is retested every 10 seconds.

The indication of a phase loop not locked will be caused by either an out-of-phase condition at the output of in-phase detector 10 or an insufficient signal strength of one of the incoming station bursts. It will be seen that either of these two conditions will produce a low signal or no signal in the output signal $f$ from the in-phase detector 10 for the particular loop in question, as shown for the B loop in FIG. 3B. This, in turn, will cause a substantially smaller integrator output signal $i$, too low to meet the amplitude level to be passed by the level detector 12. Hence, no square pulse in signal $g$ will be produced here, and the associated lamp 19 will go on.

In the present overall system as described herein, it so happens that the phase differences for position determination are taken from signals which are in quadrature from the actual received signals. Hence the "phase locked" condition is when this 90° difference exists, and the phase shifter 9 is therefore employed by the present invention to produce a desired "in-phase" signal to the indicator circuitry. However, this invention is obviously not limited to use with the identical circuitry of FIG. 1, since a suitable signal to the input of the reset integrator 11 can easily be provided from "in-phase" signal trackers, for example, merely by omitting the 90° phase shifter 9.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

I claim:

1. In a phase comparison system having a plurality of phase tracking loops: phase lock indicating means comprising:
   a. a phase detector having an equal plurality of incoming signals fed to the signal waveform input thereof and having the output of each of said phase tracking loops fed sequentially to the reference input thereof in respective coincidence with said incoming signals,
   b. a reset integrator connected to the output of said phase detector, means for resetting said integrator to zero between each one of said incoming signals,
   c. a level detector connected to the output of said reset integrator, said level detector having a push-pull output,
   d. a plurality of flip-flops connected in parallel with each other to said push-pull output, logical gate means for triggering each of said flip-flops only at the times of their respective phase signal from said level detector, and
   e. an indicating lamp circuit operatively connected to an output of each of said flip-flops.

2. In a navigation receiver having means for receiving a transmitted series of radio frequency bursts differing with respect to phase, and having a plurality of phase tracking loops adapted to phase lock with respective corresponding bursts: phase lock indicating means comprising:
   a. an in-phase detector adapted to produce a series of pulses each directly proportional in amplitude to the degree with which each of an output from said phase tracking loops is in-phase with its corresponding burst,
   b. a reset integrator connected to integrate each pulse of said series of pulses, means for resetting said integrator to zero after each of said pulses,
   c. a level detector connected to the output of said integrator and having a predetermined threshold level for passing or not passing each of said integrated pulses, means for producing a push-pull output from said level detector,
   d. a plurality of R–S flip-flops equal in number to said phase tracking loops, means connected to $S_c$ and $R_c$ terminals of said flip-flops in parallel with each other and to said push-pull output,
   e. logic means connected to the clock terminal of each of said flip-flops to store the output level of said level detector only at the times said level detector output carries the signal from the corresponding phase loop, and
   f. an indicator lamp circuit operatively connected to an output of each flip-flop.

3. Apparatus in accordance with claim 2 wherein said clock signal to each flip-flop occurs late in the period of its respective transmitted burst, and wherein said indicator lamp circuits comprise means for illuminating a respective lamp to indicate a "not phase locked" condition.

4. In a phase comparison system having a plurality of phase tracking loops: phase lock indicating means comprising a single reset integrator, means for supplying said integrator with a sequence of pulses proportional in amplitude to the degree of desired phase lock condition of each of said tracking loops, means for resetting said integrator between pulses, a level detector connected to the output of said reset integrator, one bistable trigger circuit for each said phase tracking loop, said trigger circuits connected in parallel to the output of said level detector, means for controlling the state of each trigger circuit in accordance with the output of said level detector associated with the corresponding phase loop, and visual indicating means connected to an output of each said trigger circuit.

5. Apparatus in accordance with claim 4 wherein said supply means to said reset integrator comprises an in-phase detector.

6. Apparatus in accordance with claim 4 wherein each said trigger circuit comprises an R–S type flip-flop, and said trigger circuit controlling means comprises a plurality of gate means having their outputs connected respectively to the clock terminals of said flip-flops, and gate control means for opening each of said gates only during a portion of the time that the level detector output corresponds to its respective phase loop signal.